Nov. 29, 1932.   S. BERGER   1,889,012

COMBINATION TISSUE CONTAINER

Filed Sept. 26, 1932

INVENTOR
Sol Berger
BY
James Harrison Bowen
ATTORNEY

Patented Nov. 29, 1932

1,889,012

UNITED STATES PATENT OFFICE

SOL BERGER, OF BROOKLYN, NEW YORK

COMBINATION TISSUE CONTAINER

Application filed September 26, 1932. Serial No. 634,898.

The invention is a combination container for tissues used to remove cosmetics in which a storage compartment is provided for the tissues and also a small compact packet is provided therewith and attached thereto in which a few of said tissues from said storage compartment may be carried in a purse or handbag.

The object of the invention is to provide a storage container for tissues and also a small packet in which some of the tissues from the storage container may be carried in a purse or handbag.

Another object of the invention is to provide a storage container in combination with a small packet in which the packet forms a part of the container.

Another object is to provide a storage container and a packet in combination therewith in which both are made from the same piece of material.

Another object is to provide a storage container with a compact in combination and made integral therewith in which the compact may be torn from the container.

A further object is to provide a storage container for tissues and a refill compact in combination therewith.

And a still further object of the invention is to provide a storage container having a detachable refill compact in combination therewith which is of a simple and economical construction.

With these ends in view the invention embodies a storage container adapted to hold tissues for removing cosmetics and a small compact packet in combination therewith for holding a few of the tissues from the container.

Other features and advantages of the invention will appear from the following description taken in connection with the drawing, wherein:—

Figure 1:
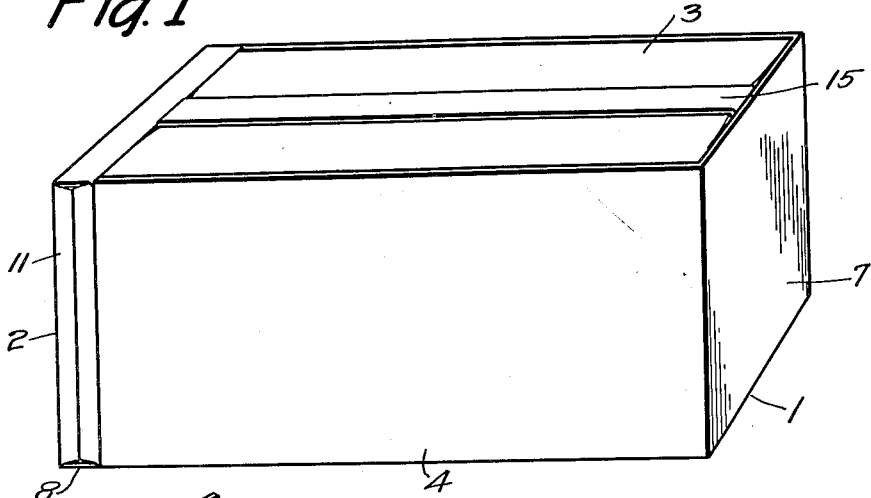
Figure 1 is a view showing the complete container folded.

In the drawing the container is shown as it would be made wherein numeral 1 indicates the container, numeral 2 the packet, and numeral 3 tissues that may be placed in the container and packet.

The container 1 may be made as shown in Figure 1 of a rectangular shaped box with the top and one end open and the packet 2 formed at the open end. It will be understood, however, that the container may be of any other shape, size or design and may be formed in any manner, and also that the packet 2 may be attached thereto by any other means or formed in any other manner. In this design the container is made with sides 4 and 5, a bottom 6 and one end 7 and the packet is attached at the opposite end by a flap 8, and formed with two squares 9 and 10, holding cleats 11 and 12 at the edges and a tongue 13 at the open end. It will be noted that the packet 2 may be torn from the container at either side of the flap 8, which may be perforated, and, with several of the tissues under the cleats, folded with the tongue 13 placed in a slit 14 in the part 9. When the packet is removed and filled it may be placed in a purse or handbag so that it is not necessary to carry the container and it is not practical to place the fine tissues directly in the purse as they are very thin and soon become soiled and torn. The packet may then be refilled as the tissues are used. A strip of material 15 may be placed across the top of the container with the ends extending downward inside or at the end of the tissues, if desired, and the complete container may be wrapped in cellophane as shown in Figures 3 and 4.

Figure 2:
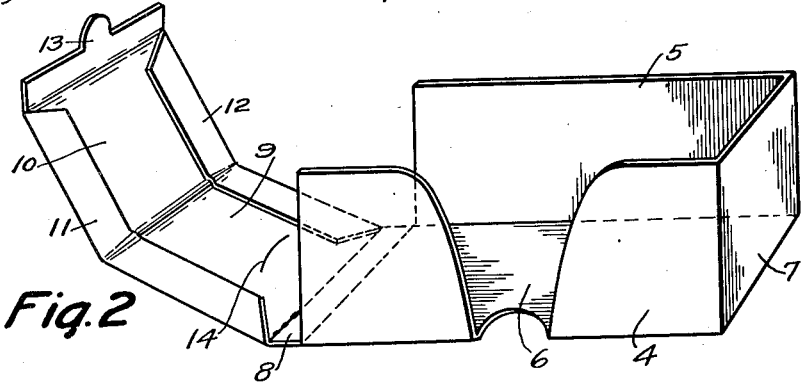
Figure 2 is a view showing the container with the packet in the open position, with the tissues removed, and with a modification showing an opening in one side.

In the design shown in Figure 2 an opening is provided in one side and a thumb opening may be provided in the base to facilitate the removal of the tissues. It will be understood that these openings may be of any other shape or provided at any other point, or as many openings as may be desired may be used.

Figure 3:
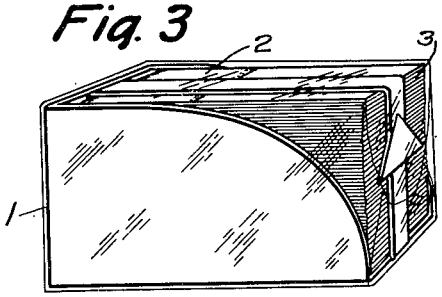
Figure 3 is a view showing a container of an alternate design in which the packet is placed on top of the container.
Figure 4:
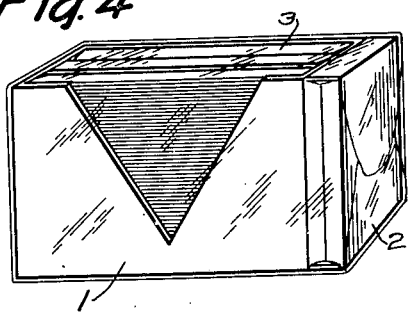
Figure 4 is a view showing another alternate design in which the packet is provided at the end of the container as in Figure 1 and the container and packet wrapped in cellophane.
Figure 5:
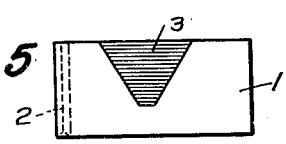
Figure 5 is a view also showing an alternate design in which the packet is folded inside of one end of the container.

In the designs shown in Figures 3 and 4 the packets are wrapped in cellophane with the cointainer. The container in Figure 3 is similar to that shown in Figure 1 except that the corners of the sides at the open end are rounded and the flap 8 removed, and in Figure 4 both ends of the container are closed. The container shown in Figure 5 is also similar to that shown in Figure 1 except that the packet is folded between the sides instead of beyond the ends thereof.

Having thus fully described the invention what I claim as new and desire to secure by Letters Patent, is:

In a combination container, a rectangular shaped box with the top open and the edges of one end free, a perforated flap extending from the bottom at the open end, a folding packet with holding members at the edges extending from said perforated flap and adapted to fold to form a closure for the open end of the box, said packet adapted to be torn from said box, and a tongue on said packet adapted to be inserted in a slit therein to hold said packet closed.

In testimony whereof I affix my signature.

SOL BERGER.